United States Patent [19]
Bogosh

[11] 3,843,109
[45] Oct. 22, 1974

[54] WORKHOLDING AND POSITIONING SYSTEM

[76] Inventor: Donald Bogosh, 2646 Willow, Franklin Park, Ill. 60131

[22] Filed: May 15, 1972

[21] Appl. No.: 253,344

[52] U.S. Cl.................. 269/22, 60/547, 92/130, 269/28, 279/4
[51] Int. Cl..... B23q 3/08, B23b 31/30, F01b 25/00
[58] Field of Search....... 269/22, 28; 279/4; 91/390; 92/130; 60/547

[56] References Cited
UNITED STATES PATENTS

| | | | |
|---|---|---|---|
| 559,560 | 5/1896 | Wright | 92/130 X |
| 2,384,774 | 9/1945 | Smallpeice | 91/390 X |
| 2,916,883 | 12/1959 | Geck | 92/130 |
| 3,145,983 | 8/1964 | Higbee | 267/177 |
| 3,498,121 | 3/1970 | Engelbrecht et al. | 279/4 X |
| 3,542,354 | 11/1970 | Fitzpatrick | 269/22 |
| 3,677,559 | 7/1972 | Andre et al. | 279/4 X |

*Primary Examiner*—Roy Lake
*Assistant Examiner*—Neil Abrams
*Attorney, Agent, or Firm*—Stone, Wagner & Aubel

[57] ABSTRACT

A fluid pressure operated workholding system particularly adapted to securely maintain a workpiece in a desired position during a manufacturing operation, including a source of first pressurized fluid, a first fluid conduit means communicating this source with a pressure pump and control means, and a second fluid conduit means communicating the pressure pump and control means with a workholder means having a fluid pressure responsive means which may be disposed about the workpiece to be held. The pressure pump and control means is divided into separate, variable volumes by a piston means mounted for movement within it in response to pressure exerted on it by the first fluid, and moves to force a second fluid contained in one of the volumes, through the second conduit means to the workholder means to expand the means responsive to fluid pressure to contact and hold the workpiece at a pressure determined by a means biasing the piston means. A work positioning system in which separate pressure pump and control means are in communication with opposite sides of a piston means in a positioning chamber to move the piston means relative to the difference in pressure exerted on opposite sides thereof, through each pressure pump and control means, to incrementally feed and position material.

16 Claims, 7 Drawing Figures

WORKHOLDING AND POSITIONING SYSTEM

The invention relates to fluid pressure operated workholding and positioning systems in which fluid is applied at a desired and controlled pressure to hold a workpiece in position or to incrementally move material.

Many manufacturing and finishing procedures require operations, such as milling or boring, to be performed upon a workpiece or member. In the past, the holding and positioning of such a workpiece to permit ease in the performance of the operation itself and also to maintain the workpiece securely in a relatively unmovable position during such an operation, has been a major problem. Though manual holding of such members or workpieces is often common, it obviously does not always permit the maintenance of the workpiece in a relatively fixed or secure position. Alternatively, mechanical methods of holding workpieces, such as vices, clamps and the like, have been used, but these means are usually mechanically complex or too cumbersome to allow maneuvering of the member into readily operable position. Such mechanical devices, because they provide a metal-to-metal interface with the member being held, are also susceptible to slippage or may exert too great a holding force upon the member, thereby causing damage to it. Moreover, all the mechanical methods require time to tighten around the workpiece and readjust at various stages of the operation, which reduces the efficiency and economy of the entire manufacturing process.

Likewise, in positioning or incrementally feeding materials or members in a manufacturing operation, hand methods have proven to be inaccurate and unreliable, while automatic procedures, accomplished by mechanical devices, are often complex and subject to frequent mechanical malfunction and breakdowns. Furthermore, the mechanical-type feeding devices of the prior art have often been difficult, if not impossible, to adjust precisely or without haulting the entire feeding operation.

DESCRIPTION OF THE INVENTION

This invention involves a novel workholding and positioning system providing for the secure maintenance of a workpiece in a desired position during manufacturing or the feeding of such a workpiece or material with precision and regularity. This invention overcomes the disadvantages of previous methods of holding or feeding materials by a pressure pump and control means which includes a chamber having a piston means movable within it. The piston means has a piston head which fluid-tightly divides the chamber into a pressure pumping volume and an expansion volume. The expansion volume of the chamber is in communication with a source of pressurized fluid, such as compressed air, which is normally found in shops and factories. The pressurized fluid or compressed air is transferred through a first fluid conduit having a three-way valve and is admitted to the expansion volume where it acts to move the piston means and increase the volume of the expansion volume. The piston means, however, is biased against such movement by biasing means, which may include a predetermined number of weights placed upon a rod means attached to the piston head, or resilient means such as a constant force spring.

A second fluid, which must be an incompressible liquid, initially fills the chamber pumping volume and the volume of a second fluid conduit means leading to a workholder means or a positioning chamber, depending upon the use of the system. Upon application of compressed air sufficient to move the piston head and expand the expansion volume despite the biasing means, the piston head will act to force the second fluid through the second fluid conduit means into the workholder means or the positioning chamber.

The workholder means preferably includes a hollow cylindrical sleeve having its interior surface lined with an elastomeric material which is fluid-tightly wrapped and held over the outside ends of the sleeve. This configuration forms an envelope between the interior surface of the elastomeric material and the interior surface of the sleeve. Prior to activation of the workholding system, the unexpanded elastomeric means confines the second fluid so that a workpiece may be inserted through the sleeve. The valve is then opened to the source of compressed air and the second fluid is thereby forced through the second fluid conduit into the interior of the envelope, expanding the elastomeric material to decrease uniformly the interior diameter of the workholder means. The elastomeric material, and thus, the workholder means, thereby contacts the exterior surface of the workpiece which it surrounds, exerting an equal pressure about this entire surface in proportion to the amount of force exerted through the second fluid by the piston means and controlled by the resistance of the biasing means to movement.

In this manner, the workholding system acts to very securely, and without complex mechanical parts, hold the workpiece in a workholder means which is readily maneuverable to an easily accessible position. When the desired operation is completed, the compressed air is exhausted through the valve to allow positive return of the piston and the elastomeric means to their initial positions by action of the biasing means and atmospheric pressure.

In the system to accomplish feeding of a workpiece or material, two of the above-described pressure pump and control means are used, each of which have compressed air admitted into their expansion volumes as above to move their respective piston means to force the second fluid through second fluid conduit means to a positioning means. This positioning means includes a chamber fluid-tightly divided by a piston means or pressure-responsive means into variable first and second balancing volumes. The separate pressure pump and control means communicate with opposite balancing volumes and may be operated alternately or simultaneously to produce, by varying their respective biasing means, a difference in pressure exerted on opposite faces of the piston head and thereby move the piston means in the positioning chamber in response to this pressure differential. If the two pressure pump and control means are operated first alternately, and then simultaneously, the positioning piston means will be moved with great precision, to first feed a great length of material and then to feed incremental lengths of material into a machine or workholder.

The unique workholding and feeding systems of this invention provide the significant advantages of great simplicity, lack of complex mechanical parts, secure and firm holding of a workpiece, a flexible and maneuverable workholder, precise control over the pressure exerted on the workpiece, and controlled, incremental feeding of material.

Accordingly, it is an object of this invention to provide a fluid pressure operated workholding and positioning system.

It is a further object of this invention to provide a workholding system which is simple in construction and reliable in operation and acts to maintain a workpiece in a secure and easily accessible position despite the forces exerted on the workpiece during manufacture.

It is another object of this invention to provide a work positioning system which is simple in construction and reliable in operation and permits the precisely-controlled incremental feeding of material in manufacturing operations.

It is still another object of this invention to provide a fluid pressure operated workholding and positioning system which uses an incompressible fluid as a working fluid to increase stability and control and prevent fluid rebound in feeding and holding operations.

It is also a further object of this invention to provide a pressure operated pressure pump and control means adapted for use in a workholding and positioning system which acts to apply a controlled fluid pressure to a means responsive to pressure.

It is one more object of this invention to provide a workholder means adapted for use in a fluid pressure operated workholding and positioning system to exert a uniform holding force on all surfaces of a workpiece with which it comes into contact.

These and other important objects of this invention will become apparent from the following description taken in conjunction with the drawings illustrating preferred embodiments wherein.

Figure 1:
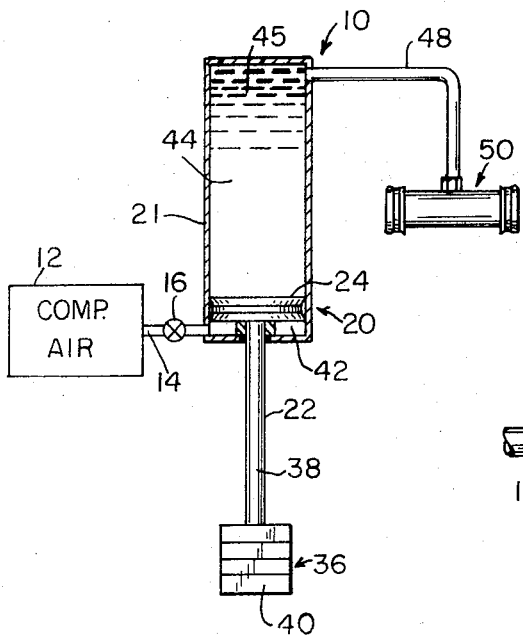
FIG. 1 is a schematic view of the workholding system of this invention having a pressure pump and control means and a workholder means.

Referring now to the drawings and in particular to FIG. 1, this invention, particularly adapted for use as a workholding system, is shown generally at 10. This system functions to use a source of pressurized fluid, such as compressed air running through a shop line, to hold and maintain securely, in a desired position, a member or workpiece upon which an operation is to be performed.

This workholding system 10 includes a source of a first pressurized fluid, such as compressed air, 12 which transmits such fluid through a first fluid conduit means 14 past a three-way valve means 16, in open position, to a pressure pump and control means shown generally at 20. In the preferred embodiment shown in FIG. 1, this pressure pump and control means 20 includes a cylindrical chamber 21 closed and sealed at its opposite ends, having mounted for movement therein a piston means 22 having a piston head 24 and a stem or rod 38 connected to head 24 and extending through one end of the chamber 21.

Figure 2:
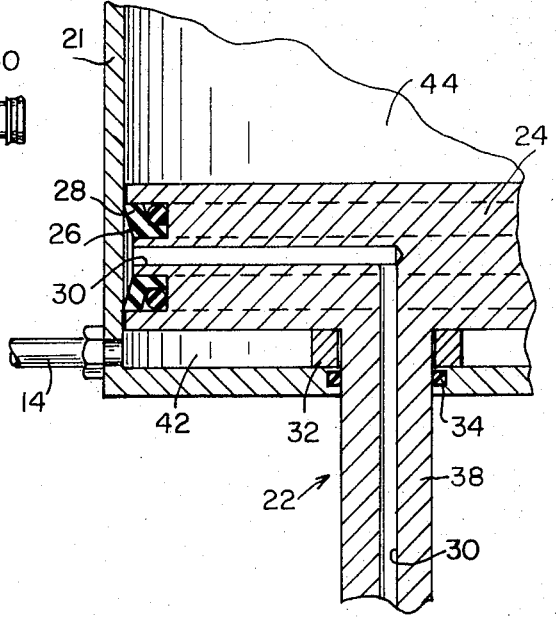
FIG. 2 is an enlarged fragmentary cross-sectional view of a lower corner section of the pressure pump and control means shown in FIG. 1, showing the fluid-tight relationship between the elements of this pressure pump and control means.

This piston means 22 is shown in greater detail in FIG. 2. While piston means 22 is movable within the chamber 21, a fluid-tight seal is always maintained between the circumferential surface of the piston head 24 and the interior surface of the side wall of the chamber 21 by a sealing cup 26 mounted on piston head 24 and resiliently biased against the interior side wall of the chamber 21 by O-ring 28. A drain line 30, located within piston head 24 and the rod 38, prevents any fluid entering from either side of piston head 24 from leaking to the opposite side if the normally fluid-tight seal formed by sealing cup 26 and O-ring 28 should fail, by draining off any such fluid which might collect within the fluid-tight seal.

The fluid-tight seal effectively divides the chamber 21 into an upper or pumping volume 44 and a lower or expansion volume 42. The expansion volume 42 increases in volume as first pressurized fluid or compressed air is admitted from source 12 pushing piston head 24 upward in chamber 21. The pumping volume 44, which is filled with an incompressible second fluid 45, is correspondingly decreased in volume as the expansion volume 42 increases in volume, so that second fluid 45 is forced out of pumping volume 44 by piston head 24. The chamber 21 has spacer means 32 located in the expansion volume 42 which maintains the bottom face of piston head 24 spaced a distance above the bottom surface of chamber 21, corresponding at least to the diameter of the first fluid conduit means 14, when the system is deactivated. This preserves the fluid-tight seal and facilitates enlargement of the expansion volume 42 by the admission of compressed air. An O-ring 34 is disposed about the circumference of the rod 38 about the opening where it exits chamber 21 to assure that a fluid-tight seal is maintained between rod 38 and chamber 21.

In the preferred embodiment shown in the drawings, biasing means 36 is located at the opposite end of rod 38 from piston head 24. Biasing means 36 may include one or more weights 40 which act by gravity to exert a known and constant downward force upon piston head 24. Biasing means 36 thereby tends to resist enlargement of the expansion volume 42 by the first pressurized fluid, and, in turn, controls the pressure which may be exerted through second fluid 45 transferred from pumping volume 44, as will be explained in greater detail below.

It is clear that biasing means 36 could take any desired form which would perform the same function of controlling the pressure applied through the second fluid 45, such as a constant force spring. In such an embodiment, the weights 40, and even rod 38, might be eliminated since such a spring could be located within chamber 21.

Figure 3:
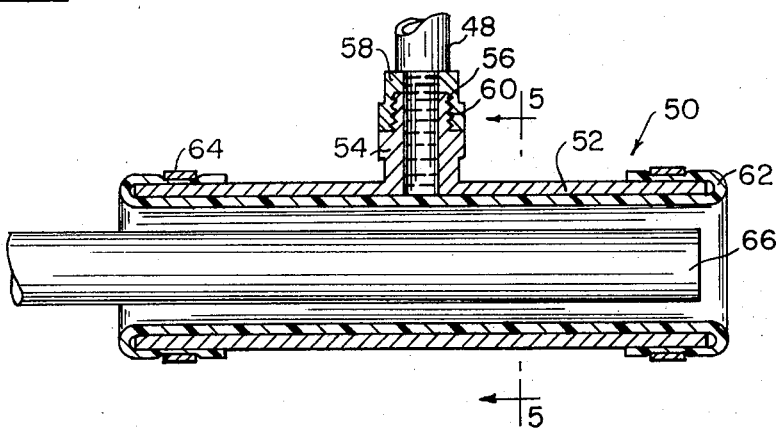
FIG. 3 is an enlarged side cross-sectional view of the workholder means shown in FIG. 1, with the system in a non-activated condition.

The pumping volume 44 of pressure pump and control means 20 is connected to a workholder means 50 by a second fluid conduit means 48 which transfers second fluid 45 thereto. The workholder means 50 is shown in greater detail in FIGS. 3–6 of the drawings. As shown in FIG. 3, prior to actuation to operating position, the workholder means 50 includes a cylindrical sleeve 52 which is formed to receive a workpiece or member 66 into and through its interior and to surround a portion of the exterior surface of such member 66. Sleeve 52 has a coupling port 54 attached to or formed in its side to present an opening to its interior therethrough. This coupling port 54 may have external threads 56 formed at one end thereof to threadedly engage internal threads 60 on a coupling nut 58 and thereby fluid-tightly connect second fluid conduit means 48 to it. This connection allows the second fluid conduit means 48 to transfer second fluid 45 from pressure pump and control means 20 to the interior of cylindrical sleeve 52 without fluid leakage.

The cylindrical sleeve 52 is lined over its interior surface with an expansible elastomeric means 62. This elastomeric means 62 is rolled back over the exterior surface of the cylindrical sleeve 52 at each end thereof and banded thereto by holding means 64, such as steel bands, to form a fluid-tight seal between all surfaces of the cylindrical sleeve 52 and elastomeric means 62. As shown in FIG. 3 and more clearly in FIG. 4, the elastomeric material 62 is so mounted in relation to the interior surface of cylindrical sleeve 52 that an expansible envelope is formed to receive second fluid 45 from pressure pump and control means 20.

In the operation of the workholding system 10, a workpiece or member 66 to be held is first inserted through the workholder means 50, as shown in FIG. 3. The source of compressed air 12, which is used to operate the system, is then communicated to pressure pump and control means 20 through first fluid conduit means 14 by opening the normally closed three-way valve 16. This compressed air or first pressurized fluid is at a pressure which is usually too great or insufficient in itself to be used directly to hold the workpiece 66, depending on the size and strength characteristics of the workpiece 66. This first pressurized fluid is therefore modulated, that is, its effective pressure is increased or decreased to a constant and known level, by the pressure pump and control means 20. Thus, when the first pressurized fluid is communicated to expansion volume 42 of chamber 21, it exerts an upward force on the piston head 24 which acts to move piston head 24 in an upward direction and thereby enlarge the volume of expansion volume 42. As piston head 24 is moved upward, it pushes or transmits the incompressible second fluid 45, such as water, which initially, in the non-activated system state, fills second fluid conduit means 48, out of pumping volume 44. Fluid 45 is forced through second fluid conduit 48 into workholder means 50, by expanding the elastomeric means 62 which has initially confined it, to hold the workpiece 66.

Since, by Pascal's principle, an increase in pressure on any part of a confined liquid causes an equal increase throughout the liquid, the pressure produced by the force exerted at the urging of the first pressurized fluid through the area of the piston head 24 on the second fluid 45, will equal the pressure produced by the larger force exerted by the incompressible second fluid 45 through the larger area of elastomeric means 62 on the workpiece 66. A large force may therefore be exerted through a small distance in the workholder means 50 on the workpiece 66 to maintain it securely in a working position, by the exertion of a small force through a large distance within chamber 21.

While the amount of force exerted in workholder means 50 may be controlled by varying the area of piston head 24 and/or the area of the elastomeric means 62, such adjustments during manufacturing operations are obviously not feasible. The unique pressure pump and control means 20 of this invention, however, makes it possible to not only vary but also control pressure exerted on the workpiece 66 without varying the dimensions of the elements forming the invention. This control is accomplished by biasing means 36 which exerts a constant force on piston head 24 in opposition to the force exerted by the compressed air. Since the pressure of the first pressurized fluid is normally constant, its effect upon the piston head 24 and, therefore, the pressure exerted upon workpiece 66 through second fluid 45 forced out of chamber 21 by piston head 24, may be increased or decreased simply by increasing or decreasing the weight of the biasing means 36. Thus, the effective force exerted by the second fluid 45 may be varied by variation of the opposing force exerted by the biasing means 36 alone.

Figure 4:
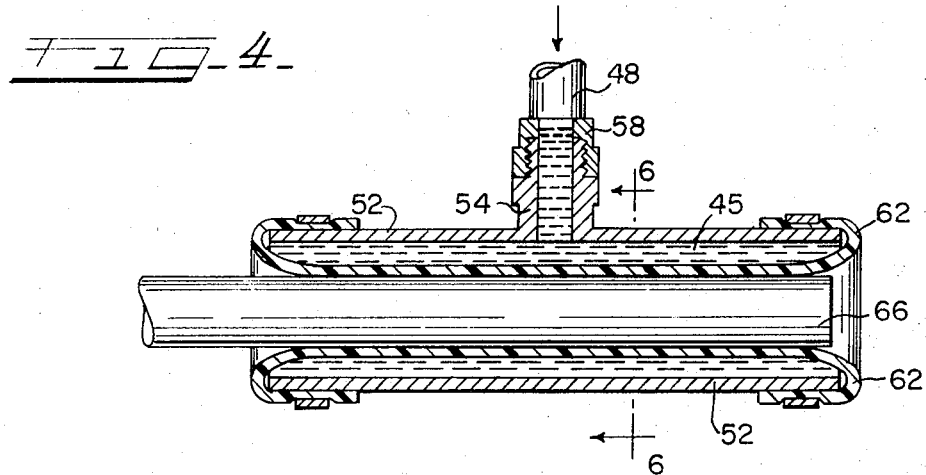
FIG. 4 is an enlarged side cross-sectional view of the workholder means shown in FIG. 1 with the system activated and the workholder means in holding position.
Figure 6:
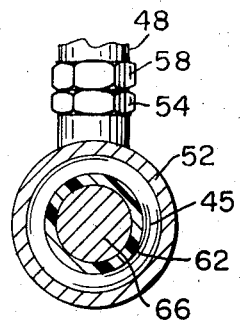
FIG. 6 is an end cross-sectional view of the workholder means shown in FIG. 4.

When the second fluid 45 is pumped through conduit means 48 and connecting port 54 into the envelope formed by the adjoining interior surfaces of the elastomeric means 62 and cylindrical sleeve 52, it expands the elastomeric means 62, as shown in FIGS. 4 and 6, to surround a portion of the exterior surface of workpiece 66, and exerts a sufficient pressure, controlled by biasing means 36, to securely and firmly hold the workpiece 66 within workholding means 50. This pressure exerted by the second fluid 45 through elastomeric means 62 on workpiece 66 may, as described above, be varied from a mere squeezing pressure to a crushing pressure.

When the operation on the workpiece 66 has been completed, the three-way valve 16 is moved to an exhaust position to exhaust the compressed air contained within expansion volume 42 to the atmosphere. The weight of the biasing means 36 and the second fluid 45 remaining in the pumping volume 44 then acts to return the piston means 22 to its initial position, depressurizing second fluid 45 and enabling it to be positively forced from the elastomeric envelope by the exterior atmospheric pressure.

Not only does this workholding system 10 provide for control of the pressure exerted on the workpiece 66, depending on the type of workpiece or the conditions required, it also, by use of the incompressible fluid 45 through the elastomeric means 62, provides for the uniform application of pressure about the external surface of the member 66 which is contacted by the elastomeric means 62, thus assuring a uniform holding action.

Figure 7:
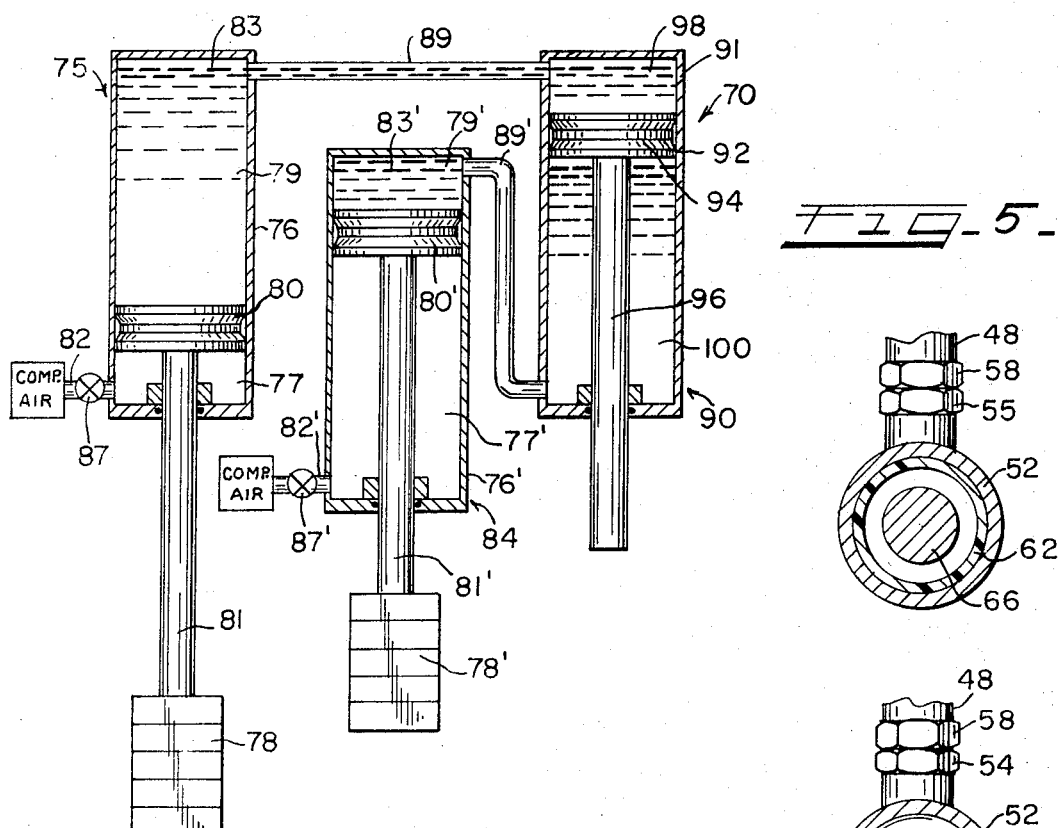
FIG. 7 is a schematic view of the work positioning system of this invention.
Figure 5:
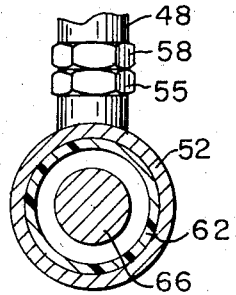
FIG. 5 is an end cross-sectional view of the workholder means shown in FIG. 3.

The work positioning or feeding system of this invention is shown in general at 70 in FIG. 7. This work positioning system 70 basically involves the use of two parallel pressure pump and control means, as described above, which act through a positioning means 90 to feed a workpiece (not shown) into a machine for milling, rolling or the like.

The positioning system 70 includes a first pressure pump and control means 75 having a chamber 76 which is fluid-tightly divided by a piston head 80, movable within the chamber 76, to define an expansion volume 77 and a pumping volume 79. The pumping volume 79 contains an incompressible second fluid 83, such as water. The fluid 83 above the piston head 80, together with a biasing means 78 attached to rod 81, urge the piston head 80 in a downward direction. The expansion volume 77 is connected through first fluid conduit means 82 to a source of pressurized fluid, such as compressed air, as explained above. A three-way valve 87 is disposed in the conduit means 82 to permit communication of the source of compressed air with the expansion volume 77.

The second pumping and control means 84 also has a chamber 76', a piston head 80' which is movable within the chamber 76' and serves to divide the chamber 76' into an expansion volume 77' and a pumping volume 79', and a rod 81' which connects the piston head 80' to biasing means 78'. This second pumping and control means 84 likewise has its expansion volume 77' connected through a first fluid conduit means 82' to a source of first pressurized fluid or compressed air. A three-way valve means 87' is disposed in the conduit means 82'. The pumping volume 79' is also filled with an incompressible fluid 83', such as water, which may be pumped therefrom upon operation of the piston head 80'. The same source of compressed air, such as a single compressed air line in a shop, may be used for both the first pumping and control means 75 and second pumping and control means 84.

The pumping and control means 75 and 84 have their pumping volumes 79 and 79' in communication with a positioning means 90 which includes a cylindrical chamber 91 which is fluid-tightly closed and sealed at its opposite ends, and which has disposed for vertical movement therein a piston means 92 which includes a piston head 94 and a feeding rod or stem 96 extending from the head 94 through one end wall of the chamber 91. The piston head 94 divides the chamber 91 into separate first balancing volume 98 and second balancing volume 100 filled with similar second fluids 83 and 83', respectively. Communication of fluid from one balancing volume to the other is prevented by means of a fluid-tight seal, corresponding to that described above, disposed around the circumference of the piston head 94. The pumping volume 79 of first pumping and control means 75 is in communication, through a second fluid conduit means 89, with first balancing volume 98, and the pumping volume 79' of second pumping and control means 84 is in communication, through second fluid conduit means 89', with second balancing volume 100.

In the operation of the positioning and incremental feeding system 70 shown in FIG. 7, the positioning rod 96 will always be moved a distance in either direction corresponding to the difference in pressure exerted upon the opposite sides of piston head 94. If normally closed valves 87 and 87' are opened at the same moment to simultaneously communicate the expansion volumes 77 and 77' with the source of compressed air, and the slight difference in surface area of the opposite faces of the piston head 94 is compensated for by initial variation of the biasing means 78 and 78', then the piston head 94 should be maintained in a relatively stationary position, since the forces exerted on the opposite faces of the piston haed 94 by the second fluid 83 and 83' under pressure will be approximately equal. By increasing the weight on the biasing means 78' of the second pump and control means 84, however, the force exerted by this control means 84 on the bottom side of piston head 94 may be decreased, so that the greater pressure will be exerted on the top side of piston head 94. The piston head 94 and attached positioning rod 96 will then be urged downward to feed material toward a machine until equilibrium is again established. It is clear that, in highly automated operations, this same movement could be accomplished by bleeding air pressure from expansion volume 77'.

It would also be possible to open the valves 87 and 87' consecutively, such that the pressure exerted in first balancing volume 98 on the top side of piston head 94 is much larger than the pressure available on the opposite side of piston head 94, causing a rapid and large downward movement of the positioning rod 96. The valve 87' could then be opened to the source of compressed air to supply a slowing or modulating force on the bottom side of piston head 94. In this way, material could be rapidly fed a great distance into a machine until the portion of the material upon which the milling or other operation to be performed was reached. Feeding could then be slowed down and carefully controlled, as above, so that the material is slowly and incrementally fed through the machine. As mentioned above, by bleeding or exhausting compressed air from the expansion chamber 77' of second pump and control means 84, while admitting compressed air to expansion chamber 77 of first pump and control means 75, in a series of consecutive steps, positioning rod 96 may be moved a series of increments or equal small distances, thus incrementally feeding material toward a machine. It is therefore possible to feed materials over very precise distances and at extremely variable and precisely controlled rates of speed by this invention.

The use of an incompressible fluid 83 and 83', such as water, as a pressure transmitting second fluid in the system eliminates the fluid rebound which might occur when a material is rapidly fed a great distance by mechanical means or using a compressible fluid, and suddenly brought to a near stop by an opposite force.

The chamber, piston head, rod and sleeve of this invention may be formed from any suitable material which may be formed in desired shapes to withstand substantial pressures and which may be made fluid-tight. The O-rings are preferably made of a resilient material, such as rubber, while the sealing cups may be made of a plastic material. The conduit means likewise may be formed from any suitable material which is fluid-tight and resistant to pressure. The second fluid contained in the pumping volume of the pump and control means is preferably incompressible to eliminate rebound, as described above, and to follow Pascal's principle.

The material used in making the elastomeric means may be any suitable impermeable elastomeric material which is expansible and stretchable, preferably in a radial rather than a longitudinal direction, and is durable and resistant to abrasion.

It is clear that the biasing means 78 and 78' shown in FIG. 7 could be also replaced by a spring means as described in relation to the workholding embodiment of FIG. 1. Therefore, while the invention has been described in relation to preferred embodiments thereof, it will be apparent to those skilled in the art that the structural details are capable of wide variation without departing from the principles of the invention.

I claim:

1. In a workholding system operating from a source of fluid pressure and particularly adapted to securely maintain a workpiece firmly and in a desired position to allow different operations to be easily performed upon said workpiece, and including a workholding means having a hollow sleeve with an elastomeric lining which surrounds and acts upon the surface of the workpiece to grasp and hold it, the improvement comprising pressure pump and control means having chamber means, piston means defining an expansion volume and a pressure pumping volume within said chamber means, said piston means being movable within said chamber means in response to a first pressurized fluid transmitted to said expansion volume of said chamber means by said source of fluid pressure, and biasing means adjustable to urge said piston means with a constant force to move in a direction opposite to that in which said piston means is urged by said first pressurized fluid, said chamber means having a second imcompressible fluid contained within said pumping volume thereof, said second fluid being transmitted therefrom through a second conduit means, by movement of said piston means, to said workholder means to apply a pressure controlled by said biasing means to said elastomeric lining in said workholder means to move said elastomeric lining to surround and hold said workpiece.

2. The improvement set forth in claim 1 wherein said chamber means is a cylindrical container which is fluid-tightly sealed at its opposite ends.

3. The improvement set forth in claim 1 wherein said piston means includes a head portion having a diametral dimension slightly less than the interior diametral dimension of said chamber means, said head portion being freely movable within said chamber means and fluid-tightly dividing said chamber means into said pumping volume and said expansion volume, a rod means attached to said head portion and extending therefrom through said expansion volume of said chamber means and beyond one end of said chamber means, said rod means being attached to said biasing means thereby to control the movement of said piston means in response to said first pressurized fluid.

4. The improvement set forth in claim 1 wherein as said expansion volume is increased by the transfer thereinto of said first pressurized fluid, said pumping volume is correspondingly decreased, causing said second fluid contained therein to be transmitted therefrom through said second conduit means to said workholder means.

5. The improvement set forth in claim 3 wherein said biasing means includes weights attachable to said piston means in varying amounts, as desired, to restrict movement of said piston means in response to said first pressurized fluid transferred from said fluid pressure means, despite the pressure of said first pressurized fluid, to thereby control the movement of said piston means and the pressure exerted on said workpiece.

6. In a pressure operated workholding system particularly adapted to securely maintain a workpiece in a desired position to allow different operations to be easily performed upon said workpiece, and including a source of fluid pressure, a pressure pump and control means having chamber means, movable piston means dividing said chamber means into an expansion volume and a pumping volume containing an incompressible fluid, adjustable biasing means for applying a selected constant force to said piston means opposing enlargement of said expansion volume, and a first conduit means communicating said source of fluid pressure with said pressure pump and control means to move said piston means, the improvement including workholding means having support means, elastomeric means responsive to fluid pressure mounted on said support means and covering at least a portion of a surface thereof to form a fluid-tight envelope thereon, connecting means mounted on said support means to communicate the interior of said envelope defined by said elastomeric means and said covered portion of said surface of said support means with said pressure pump and control means through a second fluid conduit means, said second fluid conduit means transferring said incompressible fluid therethrough to the interior of said envelope, said fluid thereby transferred applying pressure to move said elastomeric means causing said elastomeric means to contact at least a portion of the surface of said workpiece to thereby hold said workpiece at a pressure controlled by the constant force applied to said piston means.

7. The improvement set forth in claim 6 wherein said support means includes hollow cylindrical sleeve means open at its opposite ends to receive said workpiece therethrough, said connecting means includes a connecting port formed in a side of said sleeve means to provide access to the interior of said envelope, and said elastomeric means lines said portion of an interior surface of said sleeve means and is held in fluid-tight relationship to the exterior surface of said sleeve means by holding means, said envelope formed by the adjacent interior surfaces of said elastomeric means and said sleeve means receiving through said connecting port said incompressible fluid transmitted through said second fluid conduit means, said fluid expanding said elastomeric means, causing it to surround and exert an inward force on said workpiece about a portion of the surface thereof, to thereby hold said workpiece at a controlled pressure within said workholding means.

8. A pressure pump and control means particularly adapted to transfer fluid and apply it at a controlled and desired pressure to means responsive to fluid pressure in a workholder means to cause said workholder means to firmly and securely hold and maintain a workpiece in a desired position, including:
chamber means;
piston means defining an expansion volume and a pressure pumping volume within said chamber means and movable within said chamber means in response to a first pressurized fluid transmitted to said expansion volume of said chamber means through a first fluid conduit means by a fluid pressure means;
biasing means selectively adjusted to urge, with a constant force, said piston means to move in a direction opposite that in which it is urged by said first pressurized fluid; and,
a second incompressible fluid contained within said pumping volume of said chamber means, said second fluid being transmitted therefrom by movement of said piston means in response to the influence of said first pressurized fluid on said piston means through said second fluid conduit means to said means responsive to fluid pressure in said workholder means to apply pressure, controlled by the opposing force of said biasing means, to a workpiece through said workholder means.

9. Pressure pump and control means particularly adapted to transfer fluid and apply it at a controlled and desired pressure to means responsive to fluid pressure to move said means responsive to fluid pressure, including:

chamber means;

piston means defining an expansion volume and a pressure pumping volume within said chamber means and movable within said chamber means in response to a first pressurized fluid transmitted to said expansion volume of said chamber means through a first fluid conduit means by a source of fluid pressure;

biasing means urging said piston means to move in a direction opposite that in which it is urged by said first pressurized fluid, said biasing means including weight means attachable to said piston means in varying amounts as desired to restrict movement of said piston means in response to said first pressurized fluid transferred from said source of fluid pressure; and, a second fluid contained within said pumping volume of said chamber means, said second fluid being transmitted therefrom, by movement of said piston means in response to the influence of said first pressurized fluid on said piston means, through second fluid conduit means to said means responsive to fluid pressure to apply a pressure controlled by said biasing means thereto.

10. A fluid pressure operated workholding system, particularly adapted to securely and firmly maintain a workpiece in a desired position to allow various manufacturing operations to be easily performed upon said workpiece including;

fluid pressure means providing a source of pressurized gas;

pressure pump and control means having chamber means and piston means defining an expansion volume and a pressure pumping volume in said chamber means, said piston means being disposed for movement in said chamber means;

first fluid conduit means communicating said fluid pressure means with said expansion volume of said pressure pump and control means;

workholder means formed by hollow sleeve means open at its opposite ends to receive said workpiece therethrough and having port means formed and formed therein, and elastomeric means disposed within said sleeve means, said elastomeric means being responsive to fluid pressure and positionable about at least a portion of an outside surface of said workpiece;

second fluid conduit means communicating said pressure pumping volume with said workholder means and said pressure-responsive elastomeric means;

said piston means being movable in response to a first pressurized gas transmitted thereto from said fluid pressure means through said first fluid conduit means, to transmit a second incompressible fluid contained within said pressure pumping volume of said chamber means and said second fluid conduit means out of said pressure pumping volume and through said second fluid conduit means to apply pressure to said elastomeric means to thereby move said elastomeric means into contact with said surface of said workpiece to firmly and securely grasp and hold said workpiece with uniform pressure; and, biasing means urging said piston means with a constant force, which may be adjusted as desired, to move in a direction opposite to that in which said piston means is urged by said first pressurized gas, to effectively control the force exerted by said piston means on said second incompressible fluid despite the force exerted by said first pressurized gas on said piston means, to thereby control the pressure applied by said second incompressible fluid through said elastomeric means to said workpiece, and said biasing means also assisting in obtaining immediate, positive release of said workpiece when said expansion volume is evacuated of said first pressurized gas.

11. The workholding system of claim 10 wherein said fluid pressure means is a source of compressed air, and said first pressurized gas is air.

12. The workholding system of claim 10 wherein said chamber means is a cylindrical container which is fluid-tightly sealed at its opposite ends.

13. The workholding system of claim 10 wherein said piston means includes a head portion having a diametral dimension slightly less than the interior diametral dimension of said chamber means, said head portion being freely movable within said chamber means and fluid-tightly dividing said chamber means into said pumping volume and said expansion volume, a rod means attached to said head portion and extending therefrom through said expansion volume of said chamber means and beyond one end of said chamber means, said rod means being attached to said biasing means thereby to control the movement of said piston means in response to said first pressurized fluid.

14. The workholding system of claim 10 wherein as said expansion volume is increased by the transfer thereinto of said first pressurized gas, said pumping volume is correspondingly decreased, causing said second incompressible fluid contained therein to be transmitted therefrom, under pressure through said second conduit means to said workholder means.

15. The workholding system of claim 10 wherein said biasing means includes weights attachable to said piston means in varying amounts, as desired, to apply a constant force to said piston means and restrict movement of said piston means in response to said first pressurized gas and thereby control the movement of said piston means and the pressure ultimately exerted on said workpiece.

16. The workholding system of claim 10 wherein said elastomeric means lines the interior surface of said hollow sleeve means to form said workholder, and is held in fluid-tight relationship to the said surface of said sleeve means by holding means, said elastomeric means being expansable by said second incompressible fluid transferred from said pumping volume of said pump and control means such that a uniform squeezing pressure is exerted through said expanded elastomeric means about a portion of the exterior surface of said workpiece.

* * * * *